June 10, 1941.　　J. H. MATTHEWS　　2,244,845
CONVEYER BELT
Filed July 30, 1938

Inventor:
John H. Matthews,
By: Lee J. Gary
Attorney.

Patented June 10, 1941

2,244,845

UNITED STATES PATENT OFFICE 2,244,845

CONVEYER BELT

John H. Matthews, Nutley, N. J., assignor to Raybestos-Manhattan, Inc., Passaic, N. J., a corporation of New Jersey Application July 30, 1938, Serial No. 222,162

7 Claims. (Cl. 154—4)

This invention relates to improvements in belts and a method of making the same, and refers specifically to an improved conveyer belt of plied fabric and a method of making the same characterized in that the upper ply or plies of the belt are prestretched transversely whereby the finished belt "troughs" or assumes a curvature concave upwardly.

To properly train or track a conveyer belt, the belt should touch the flat or center idler, and while all belts do this when loaded, many conveyer belts will not do so when running empty. As is well known, many conveyer installations run empty part of the time, due, for instance, to intermittent processes, not only is a stiff or non-troughing belt difficult to track, but due to riding on the underside adjacent the longitudinal edges on account of this failure to trough, the back cover soon wears out for a distance of several inches adjacent to the edges permitting absorption of moisture and early disintegration.

Briefly described my invention contemplates the construction of a conveyer belt having a plurality of plies, the upper ply or plies of which are stretched crosswise prior to the curing of the rubber or other binder utilized in the structure. After curing, the crosswise tension of the upper plies causes the belt to trough or curve upwardly toward the longitudinal edges, whereby, when running empty the belt rests uniformly upon all of the idlers.

In addition to securing uniform wear as hereinbefore described, the transverse stretching produces a compensating effect in the upper plies of the belt which reduces the stress or tendency of ply separation when the belt passes around a pulley.

Of course, when a plied fabric belt passes around a pulley the outer plies of the belt are stretched longitudinally to a greater extent than the inner plies, since the former travel around a greater radius of curvature. This tends to produce movement between adjacent plies and causes ply separation and undue wear. However, in transversely stretching the upper plies of the belt to secure the troughing effect hereinbefore described, another desirable condition is set up in said upper fabric plies. When the upper plies are stretched transversely, the filler threads of the fabric are rendered taut. This action, in turn, accentuates the crimp of the warp threads. In passing around a pulley the warp threads of the upper or outer plies assume the brunt of the tension, but being crimped said threads will stretch relatively freely thereby eliminating stresses which would otherwise cause relative ply movement.

In the drawing, Fig. 1 is a diagrammatic transverse sectional view of a plurality of plies illustrating particularly their relative width from top to bottom.

Figure 1:
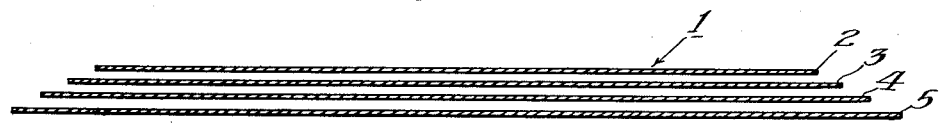

Referring in detail to the drawing, 1 indicates generally a plurality of fabric plies, preferably of duck, which are adapted to be joined together by means of rubber or other suitable binder to form a conveyer belt. In the initial formation of the belt the plies are so arranged as to width as to have the narrowest ply 2 on top, the plies 3, 4 and 5 being progressively wider toward the bottom.

Figure 2:
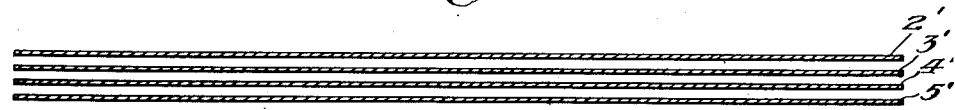
Fig. 2 is a view similar to Fig. 1 after the upper plies have been stretched crosswise.
Figure 3:
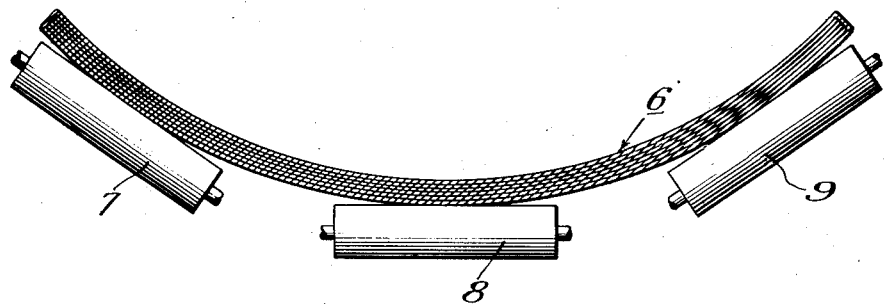
Fig. 3 is a diagrammatic transverse sectional view through my conveyer belt illustrating the "troughing" effect.
Figure 4:
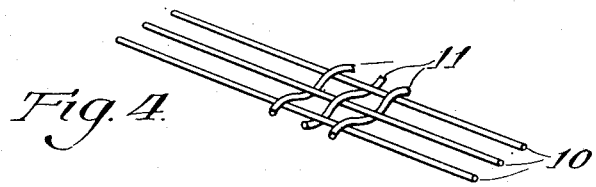
Fig. 4 is a diagrammatic perspective view illustrating the effect of transverse stretching upon the filler and warp threads of a fabric ply.

Before curing or vulcanizing the binder, however, the plies 2, 3 and 4 are stretched transversely to approximately the width of ply 5, as shown best at 2', 3' and 4' in Fig. 2. While said upper plies are in tension the binder is cured or vulcanized by heat or by heat and pressure. After curing, the belt 6 assumes a transverse curvature due to the inherent tension in the upper plies, at which time the plies assume substantially equal transverse tensions, whereby the belt rests while unloaded with substantially equal contact area and pressure upon all of the idler rolls 7, 8 and 9. Because of the fact that the belt 6, when empty, assumes the troughed curvature, excessive localized wear adjacent the longitudinal edges will be eliminated.

As another feature of my invention, the tension set up in the transverse threads or filler threads 10 accentuate or increase the amplitude of the crimp of the warp or longitudinal thread 11. Since the tension of the threads 10 in the outer fabric 2 or 2' is greatest the amplitude of the crimps in the warp threads of the fabric 2 or 2' will be greatest. This tension in the threads 10 of the fabrics 3 or 3' and 4 or 4' will progressively decrease and hence the amplitude of the crimps of the warp threads will progressively decrease. In view of the fact that the outer face of the belt in passing around a pulley is greatest, the crimps of the outer layers will tend to relieve this tension and will tend to eliminate relative movement between the plies.

In Patent No. 1,978,912 to Repony and Matthews the advantages of a laminated belt having a longitudinal curvature are set forth and a method of producing such feature is taught therein which comprises stretching a layer of belting longitudinally and securing thereon while so stretched another layer of belting material which is not stretched to an equal extent. This produces a belt which when trained around a pulley has its stresses approximately balanced or the maximum stress or tension is at or near the inner face of the belt. This prevents ply separation, and in addition eliminates the tendency of the breaking of the outer plies at the points where they are spliced by the conventional fastener or stitching means.

Thus in accordance with my present invention wherein my laminated conveyer belt is comprised of a plurality of superimposed layers of material of progressively varying width and the layers stretched transversely so that they all conform to the width of the widest strip to produce my "trough" effect, there is at the same time produced the effect set forth in the above mentioned patent, due to the fact, as hereinbefore set out, that when the filler threads are stretched the warp threads extending longitudinally are caused to take on added crimp. The greatest amount of crimp is found in the uppermost ply which is the narrowest in its original form and the degree of crimp varies progressively in each of the plies. Thus in effect my conveyer belt in passing around its pulleys has its stresses balanced and the tendency to ply separation is eliminated due to longitudinal elasticity in the upper plies. This lengthwise compensation in the top plies with the resultant longitudinal elasticity also leads to longer fastener life than has heretofore been possible. Splices made in conveyers with any of the plate type fasteners have to be removed from time to time, due to the hinge action occurring right back of the fastener as the relatively flat fastener passes over the pulleys. This causes the duck to break in the upper plies right behind the fasteners, and as stated, the belts have to be cut and re-spliced, with attendant wastage of time and materials. With greater extensibility in the upper plies such detrimental effects are greatly eliminated, and the attendant benefits obtained, in addition to the other desirable features herein set forth.

Aside from the improvements hereinbefore set forth, that is, the tendency of the belt to trough concave upwardly and the greater extensibility of the upper plies, my conveyer belt resembles conventional conveyer belts in that it is of greater width and length than thickness.

I claim as my invention:

1. The method of forming a laminated belt which comprises superimposing a plurality of plies of belting material of progressively varying widths, transversely stretching the narrower plies to conform to the width of the widest ply, and securing all of the plies together.

2. The method of forming a belt and inducing normally cross-sectional curvature therein which comprises the following successive steps, superimposing a plurality of plies of woven textile fabric, placing said plies under a progressively varying lateral tension, and securing the plies together in said relationship.

3. The method of forming a conveyer belt with an upward concavity which comprises securing an upper ply of belting material to a lower ply of greater normal width while the upper ply is held under a lateral tension which conforms it to the width of the lower ply.

4. The method of forming a laminated conveyer belt to induce an upward concavity therein longitudinally thereof and to provide longitudinal extensibility in the upper plies, which comprises superimposing a plurality of plies of woven textile fabric of progressively narrow widths on each other, stretching the filler threads of the narrower plies to conform to the width of the widest and lowermost ply, and securing the plies together in said relationship.

5. A conveyer belt of relatively great width and length compared to thickness having its load-receiving face normally arced transversely concave upwardly, comprising a plurality of plies of woven textile fabric of progressively varying widths, secured together in superimposed relationship, the faces of adjacent plies being bonded together, said plies being in substantially equal transverse tension when the belt is in normal transversely arcuate position.

6. A conveyer belt of relatively great width and length compared to thickness, having its load-receiving face normally arced transversely concave upwardly, comprising a plurality of plies of woven textile fabric of progressively varying widths, secured together in superimposed relationship, the faces of adjacent plies being bonded together, the plies of said belt being under progressively varying transverse tension when the belt is transversely flat, said plies being in substantially equal transverse tension when the belt is in normal transversely arcuate position.

7. A conveyer belt of relatively great width and length compared to thickness having its load-receiving face normally arced transversely concave upwardly, comprising a plurality of plies of woven textile fabric of progressively varying widths, secured together in superimposed relationship, the faces of adjacent plies being bonded together, said plies being in substantially equal transverse tension when the belt is in normal transversely arcuate position, and said plies having progressively lesser longitudinal extensibility from the load-receiving face to the rear face of the belt.

JOHN H. MATTHEWS.